US011553243B2

(12) United States Patent
Chung et al.

(10) Patent No.: US 11,553,243 B2
(45) Date of Patent: Jan. 10, 2023

(54) ELECTRONIC APPARATUS AND OPERATING METHOD OF THE SAME

(71) Applicant: SAMSUNG ELECTRONICS CO., LTD., Suwon-si (KR)

(72) Inventors: Jinjoo Chung, Suwon-si (KR); Minho Kim, Suwon-si (KR); Sunho Park, Suwon-si (KR); Namhyun Kim, Suwon-si (KR); Joonyoung Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 241 days.

(21) Appl. No.: 16/739,883

(22) Filed: Jan. 10, 2020

(65) Prior Publication Data
US 2020/0228862 A1 Jul. 16, 2020

(30) Foreign Application Priority Data

Jan. 10, 2019 (KR) .......................... 10-2019-0003293

(51) Int. Cl.
H04N 21/64 (2011.01)
H04L 101/622 (2022.01)
(Continued)

(52) U.S. Cl.
CPC . *H04N 21/43615* (2013.01); *H04N 21/43637* (2013.01); *H04N 21/64* (2013.01); *H04N 21/643* (2013.01); *H04L 2101/622* (2022.05)

(58) Field of Classification Search
CPC ....... H04N 21/43615; H04N 21/43637; H04N 21/64; H04N 21/643; H04L 61/6022
(Continued)

(56) References Cited

U.S. PATENT DOCUMENTS 7,756,928 B1\* 7/2010 Meenan ................ G06F 9/5055
709/219
9,628,850 B2\* 4/2017 Kwon ................ H04N 21/4782
(Continued)

FOREIGN PATENT DOCUMENTS

JP 2013246472 A 12/2013
KR 1020170037349 A 4/2017
(Continued)

OTHER PUBLICATIONS

International Search Report and Written Opinion dated Apr. 14, 2020 issued by the International Searching Authority in International Application No. PCT/KR2020/000312.
(Continued)

*Primary Examiner* — Nathan J Flynn
*Assistant Examiner* — Caroline Somera
(74) *Attorney, Agent, or Firm* — Sughrue Mion, PLLC

(57) ABSTRACT

Provided are an electronic apparatus and an operating method of the same. The electronic apparatus includes: a communicator; a memory storing one or more instructions; and a processor configured to control the electronic apparatus by executing the one or more instructions to: collect peripheral device information based on a message received from a peripheral device, by using a first device discovery protocol and a second device discovery protocol; transmit the peripheral device information to a server through the communicator; and receive a home network device list of the electronic apparatus from the server through the communicator, the home network device list being generated by the server based on the peripheral device information.

18 Claims, 14 Drawing Sheets

(51) Int. Cl.
*H04N 21/436* (2011.01)
*H04N 21/4363* (2011.01)
*H04N 21/643* (2011.01)

(58) Field of Classification Search
USPC .......................................................... 725/74
See application file for complete search history.

(56) References Cited

U.S. PATENT DOCUMENTS

| | | | |
|---|---|---|---|
| 10,375,340 B1* | 8/2019 | Dodge | H04N 21/42204 |
| 2008/0052384 A1* | 2/2008 | Marl | H04L 12/2807 |
| | | | 709/224 |
| 2009/0235317 A1* | 9/2009 | Igarashi | H04N 21/6405 |
| | | | 725/109 |
| 2011/0167154 A1* | 7/2011 | Bush | H04L 41/0893 |
| | | | 709/224 |
| 2012/0151058 A1 | 6/2012 | Lee | |
| 2013/0148573 A1* | 6/2013 | Boland | H04W 8/005 |
| | | | 370/328 |
| 2015/0312622 A1 | 10/2015 | Candelore | |
| 2016/0165570 A1* | 6/2016 | Kim | G01S 5/02 |
| | | | 455/456.2 |
| 2016/0295296 A1* | 10/2016 | Zhu | H04N 21/643 |
| 2016/0337182 A1* | 11/2016 | Shen | H04W 4/08 |
| 2017/0245133 A1 | 8/2017 | Fontaine et al. | |
| 2018/0069726 A1 | 3/2018 | Ohhira et al. | |
| 2020/0100162 A1* | 3/2020 | Sallas | H04W 4/80 |
| 2020/0136902 A1 | 4/2020 | Wang et al. | |

FOREIGN PATENT DOCUMENTS

| | | |
|---|---|---|
| WO | 2017/061081 A1 | 4/2017 |
| WO | 2019/001315 A1 | 1/2019 |

OTHER PUBLICATIONS

Arunachalam, K., et al., "Discovery and Identification of an Application for Inter-Application Communication on a Home Network Using UPnP", Journal of Computers, vol. 11, No. 6, Nov. 2015, pp. 488-496.

"Assigned numbers and GAP", May 15, 2018, Specifications: Generic Access Profile, Retrieved from https://www.bluetooth.com/specifications/assigned-numbers/generic-access-profile/, 4 pages total.

Morgan, K., "Getting Started with Bluetooth Low Energy", Jun. 30, 2014, Blog Retrieved from https://os.mbed.com/blog/entry/Get-Started-with-Bluetooth-Low-Energy/, 2 pages total.

"Bluetooth Core Specification v5.0", Dec. 6, 2016, Bluetooth SIG Proprietary, 2822 pages total.

Donoho, A., et al., "UPnP Device Architecture 2.0", Feb. 20, 2015, UPnP Forum, 196 pages total.

Communication dated Jun. 13, 2022 by the European Patent Office in counterpart European Patent Application No. 20738561.8.

* cited by examiner

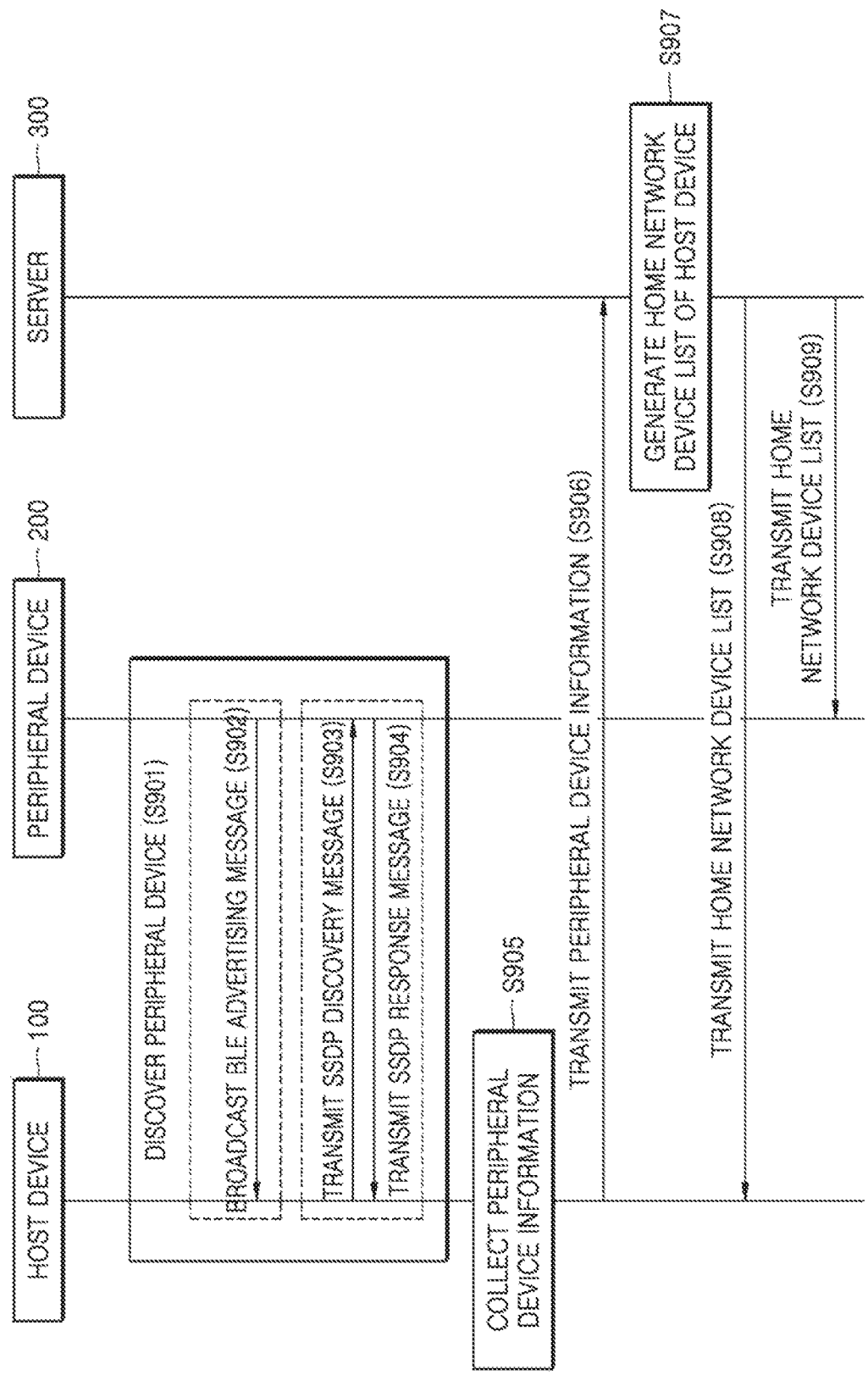

ELECTRONIC APPARATUS AND OPERATING METHOD OF THE SAME

CROSS-REFERENCE TO RELATED APPLICATION

This application is based on and claims priority under 35 U.S.C. § 119 to Korean Patent Application No. 10-2019-0003293, filed on Jan. 10, 2019, in the Korean Intellectual Property Office, the disclosure of which is incorporated by reference herein in its entirety.

BACKGROUND

1. Field

The disclosure relates to an electronic apparatus and a method of operating the same, and more particularly, to an electronic apparatus performing device discovery of a peripheral device to provide a home network device list and a method of operating the same.

2. Description of Related Art

A display device, such as a television, has a function of displaying images that may be viewed by a user. Commonly, the user may view a broadcast reproduced on a display of the display device. The display device displays a broadcast channel selected by the user from among broadcast channel signals transmitted by broadcasting stations. As a recent worldwide trend, broadcasting has changed from analog broadcasting to digital broadcasting.

In digital broadcasting, digital images and audio signals are transmitted. In comparison to analog broadcasting, digital broadcasting provides low data loss due to robustness against external noise and efficient error correction. As a result, high resolution images and clear screen images may be provided. Also, unlike analog broadcasting, digital broadcasting may provide interactive services.

In general, a smart television (TV) has been used to provide various contents in addition to a digital broadcasting function. Instead of passively operating according to the user's selection, the smart TV aims to analyze and provide functions and services tailored to the user's desire even without the user's operation.

To provide functions and services, the display device may discover a peripheral device offering one or more functions and services by using various communication methods.

Accordingly, research into a method of more accurately and effectively providing the user with a home network device list provided for connection between devices connected to the same home network is desirable.

SUMMARY

Aspects of the disclosure provide an electronic apparatus capable of discovering a peripheral device to provide a home network device list and a method of operating the same.

Technical solutions to be achieved by the disclosure are not limited to the technical solutions mentioned herein, and other technical solutions not mentioned herein may be clearly understood from the following description by those of ordinary skill in the art.

Additional aspects will be set forth in part in the description which follows and, in part, will be apparent from the description, or may be learned by practice of the presented embodiments of the disclosure.

According to an embodiment of the disclosure, there is provided an electronic apparatus including: a communicator; a memory storing one or more instructions; and a processor configured to control the electronic apparatus by executing the one or more instructions, wherein the processor executing the one or more instructions is configured to: collect peripheral device information of a peripheral device based on a message received from the peripheral device, by using a first device discovery protocol and a second device discovery protocol; transmit the peripheral device information to a server through the communicator; and receive a home network device list of the electronic apparatus indicating whether the peripheral device is connected to a home network to which the electronic apparatus is connected from the server through the communicator, the home network device list being generated by the server based on the peripheral device information.

According to an embodiment of the disclosure, there is provided a method of an electronic apparatus discovering a peripheral device including: collecting peripheral device information of the peripheral device based on a message received from the peripheral device, by using a first device discovery protocol and a second device discovery protocol; transmitting the peripheral device information to a server; and receiving a home network device list of the electronic apparatus indicating whether the peripheral device is connected to a home network to which the electronic apparatus is connected from the server, the home network device list being generated by the server based on the peripheral device information.

According to an embodiment of the disclosure, there is provided a method of discovering a home network device including: receiving, from a host device, gateway information of a home network to which the host device is connected; receiving, from the host device, peripheral device information of the home network device discovered by the host device by using a first device discovery protocol and a second device discovery protocol; generating a home network device list to include the home network device, based on a comparison of the gateway information of the host device and gateway information of the home network device included in the peripheral device information; and transmitting the home network device list to the host device.

According to another embodiment of the disclosure, there is provided a computer-readable recording medium including a recording medium that stores a program that, when executed by a computer, controls the computer to perform the above method.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 9 is a flowchart of a method of operating a system, according to an embodiment of the disclosure;

DETAILED DESCRIPTION

Figure 1:
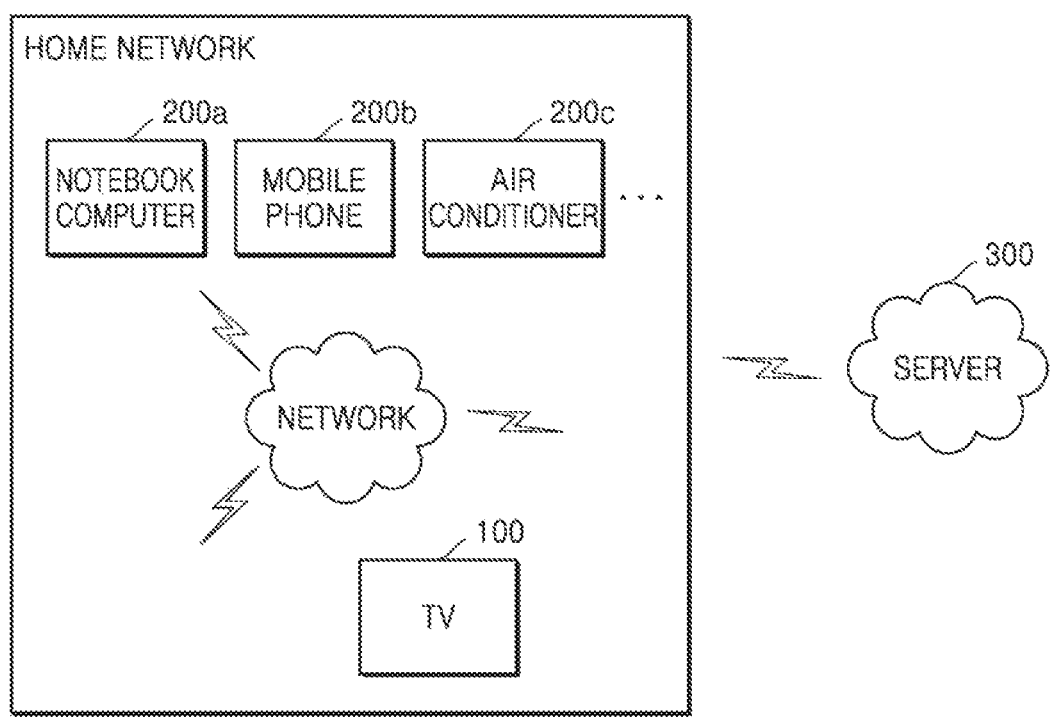
FIG. 1 is a schematic diagram of a system according to an embodiment of the disclosure.

Hereinafter, embodiments of the disclosure will be described in detail with reference to the accompanying drawings so that those of ordinary skill in the art may easily implement the embodiments of the disclosure. However, the disclosure may be implemented in various different forms and should not be construed as being limited to the embodiments of the disclosure described herein. Also, portions inessential to the description of the disclosure will be omitted in the drawings for a clear description of the disclosure, and like reference numerals will denote like elements throughout the specification.

The terms used herein are those general terms currently widely used in the art in consideration of functions in regard to the disclosure, but the terms may mean various other terms according to the intentions of those of ordinary skill in the art, precedents, or new technology in the art. Thus, the terms used herein should not be interpreted only by the names of the terms but should be interpreted based on the meanings of the terms and the contents throughout the disclosure.

Although terms such as "first" and "second" may be used herein to describe various elements or components, the elements or components should not be limited by the terms. These terms are only used to distinguish one element or component from another element or component.

Also, the terms used herein are merely for the purpose of describing particular embodiments of the disclosure and are not intended to limit the scope of the disclosure. As used herein, the singular forms "a", "an", and "the" are intended to include the plural forms as well, unless the context clearly indicates otherwise. Also, throughout the specification, when an element is referred to as being "connected" to another element, it may be "directly connected" to the other element or may be "electrically connected" to the other element with one or more intervening elements therebetween. Also, when something is referred to as "including" a component, another component may be further included unless specified otherwise.

As used herein, "the" or the like may refer to both the singular and the plural. Also, when there is no description explicitly specifying the order of operations described in a method according to the disclosure, the described operations may be performed in a suitable order. The scope of the disclosure is not limited to the described operation order.

The phrases "in some embodiments of the disclosure" or "in an embodiment of the disclosure" appearing in various places in the specification do not necessarily all refer to the same embodiment.

Some embodiments of the disclosure may be represented in terms of functional block components and various processing operations. Some or all of these functional blocks may be implemented by any number of hardware and/or software components that execute particular functions. For example, the functional blocks of the disclosure may be implemented by one or more microprocessors or may be implemented by circuit components for a certain function. Also, for example, the functional blocks of the disclosure may be implemented in various programming or scripting languages. The functional blocks may be implemented by an algorithm that is executed by one or more processors. Also, the disclosure may employ the related art for electronic environment setting, signal processing, and/or data processing. Terms such as "mechanism", "element", "unit", and "configuration" may be used in a broad sense and are not limited to mechanical and physical configurations.

Also, connection members or connection lines between elements illustrated in the drawings merely represent examples of physical or logical connections and/or functional connections. In actual devices, the connection between elements may be represented by various alternative or additional functional connections, physical connections, or logical connections.

Throughout the disclosure, the expression "at least one of a, b, or c" indicates only a, only b, only c, both a and b, both a and c, both b and c, all of a, b, and c, or variations thereof.

Hereinafter, the disclosure will be described in detail with reference to the accompanying drawings.

FIG. 1 is a schematic diagram of a system according to an embodiment of the disclosure.

Referring to FIG. 1, a system according to an embodiment of the disclosure may include devices (e.g., user devices, appliances, etc.) 100, 200a, 200b, and 200c connected to a home network, and a server 300.

According to an embodiment of the disclosure, a host device 100 and peripheral devices 200a, 200b, and 200c connected to a home network may acquire information about each other and other devices connected to the home network, by either communication with each other or through data exchange with the server 300.

According to an embodiment of the disclosure, among the devices connected to the home network, a device performing a function of discovering a peripheral device will be described as the host device 100. As illustrated in FIG. 1, the host device 100 may be a television (TV).

The host device 100 according to an embodiment of the disclosure may discover a peripheral device 200a, 200b, and 200c by using a Bluetooth Low Energy (BLE) communication protocol and a Simple Service Discovery Protocol (SSDP) discovery protocol.

According to an embodiment of the disclosure, the host device 100 may discover a peripheral device 200a, 200b, and 200c through BLE communication. The host device 100 may receive a BLE advertising message broadcast from a peripheral device 200a, 200b, and 200c, by using BLE communication. In this case, the BLE advertising message may be broadcast in the form of a BLE advertising packet.

BLE is one of various short-range communication technologies and is a core function of Bluetooth V 4.0. Compared with the classic Bluetooth standard, BLE has a relatively small duty cycle, enables low-cost production, and may operate for years on a small-sized battery with reduced average power and standby power.

Also, according to an embodiment of the disclosure, the host device 100 may discover a peripheral device by using an SSDP protocol. The host device 100 may transmit a discovery message by using the SSDP protocol. Upon receiving the discovery message, the peripheral device 200 may transmit a response message in response to the discovery message by using the SSDP protocol.

The discovery protocol refers to a protocol used to discover devices commonly connected to a local network. A device operating as a Universal Plug and Play (UPnP) control point, which may be a host device 100, may transmit an SSDP discovery message to discover a UPnP device on the same network, and the UPnP device having received the SSDP discovery message, which may be a peripheral device 200a, 200b, and 200c, may transmit a response message to the control point.

According to an embodiment of the disclosure, when the host device 100 transmits a discovery message by using the SSDP protocol, the discovery message may be transmitted in the form of a Hypertext Transfer Protocol (HTTP) packet. When the peripheral device 200 having received the SSDP discovery message transmits a response message by using the SSDP protocol, the peripheral device 200 may transmit the response message in the form of an HTTP packet.

According to an embodiment of the disclosure, by using the BLE communication protocol and the SSDP discovery protocol together, the host device 100 may more accurately acquire a home network device list of the host device 100 among the discovered peripheral devices.

to acquire the home network device list of the home network, the host device 100 may transmit the collected peripheral device information to the server 300. The server 300 may compare gateway information of the host device 100 and gateway information of each peripheral device included in the peripheral device information received from the host device 100 and generate the home network device list to include the peripheral device having the same gateway information as the gateway information of the host device 100. The server 300 may transmit the home network device list to any of the devices connected to the home network.

According to an embodiment of the disclosure, by using the BLE communication protocol and the SSDP discovery protocol together, the home network devices may be more accurately provided with information about other devices connected to the same network.

More particularly, for example, when only BLE communication is used, because peripheral devices within the BLE communication range are discovered, even neighborhood devices may be discovered. Also, when only the SSDP protocol is used, devices on the same network may be discovered; however, when a device does not use an Ethernet or WiFi router or when an UPnP function is not activated, an undiscoverable error may occur. According to an embodiment of the disclosure, it may be possible to reduce the occurrence of an error that a device connected to the same network is omitted or even a device connected to another network is classified as a home network device.

Figure 4:
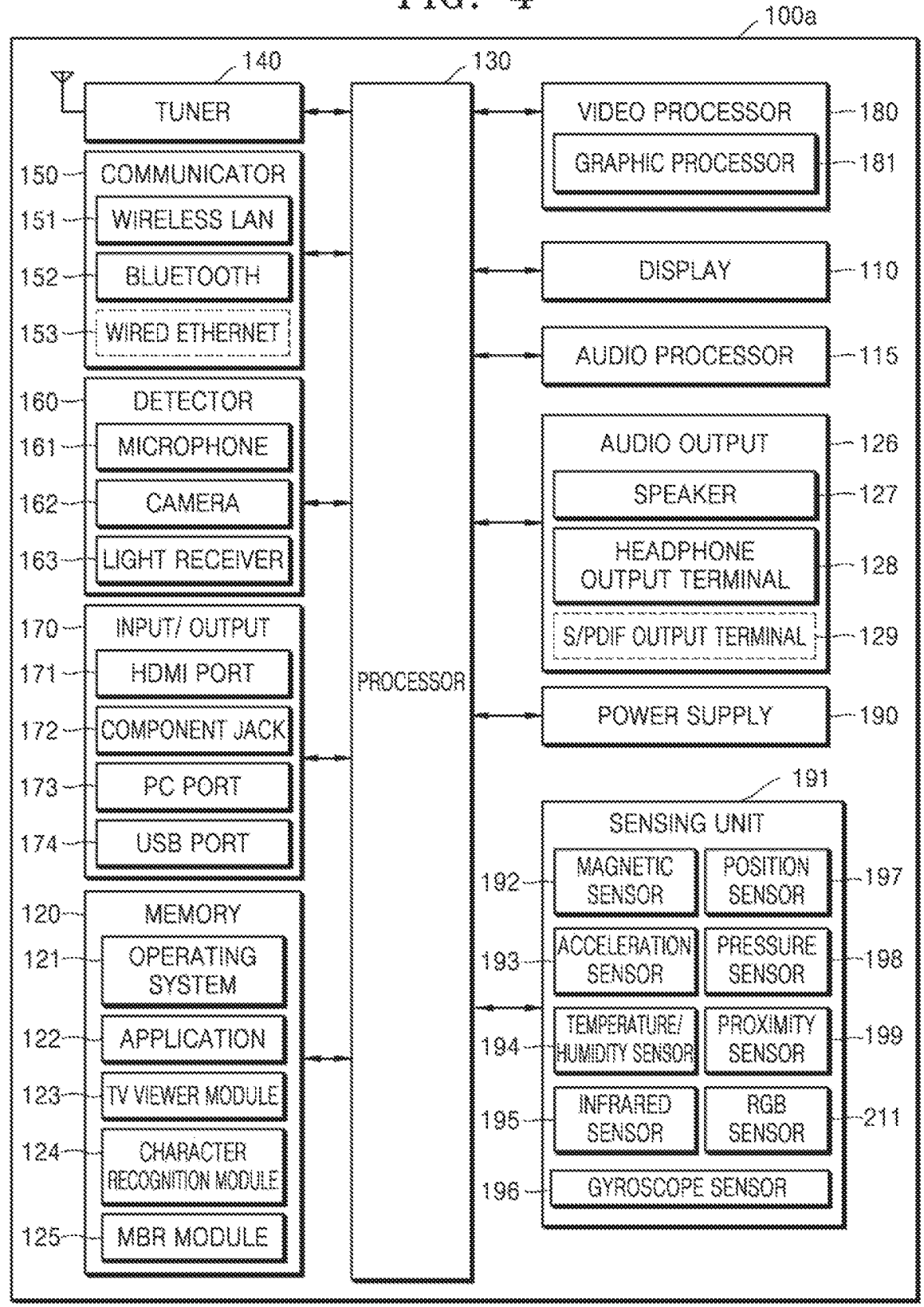
FIG. 4 is a block diagram of an electronic apparatus according to an embodiment of the disclosure.

Referring to FIG. 4, the host device 100a according to an embodiment of the disclosure may be implemented as a device (e.g., a television (TV)) including a display 110.

The host device 100a according to an embodiment of the disclosure may display, on the display 110, a user interface for performing device discovery of a peripheral device. Also, the host device 100a according to an embodiment of the disclosure may display, on the display 110, the home network device list of the host device 100 filtered by the server 300 among the peripheral device discovery results.

The host device 100 according to an embodiment of the disclosure may be a TV, but the host device 100 is not limited thereto. For example, the host device 100 may be implemented as various electronic apparatuses such as desktop computers, tablet personal computers (PCs), notebook computers (laptop computers), mobile phones, e-book terminals, digital broadcasting terminals, personal digital assistants (PDAs), portable multimedia players (PMPs), navigation devices, digital cameras, camcorders, MP3 players, and wearable devices. Also, the host device 100 may be a fixed type or a mobile type and may be a digital broadcasting receiver capable of receiving digital broadcasting.

Also, the host device 100 according to an embodiment of the disclosure may be implemented as a flat display device, a curved display device having a screen with curvature, or a flexible display device having adjustable curvature. The output resolution of the host device 100 may include, for example, High Definition (HD), Full HD, Ultra HD, or resolution higher than Ultra HD. The host device 100 according to an embodiment of the disclosure may output content (e.g., video and audio data) input through various external input sources (e.g., set-top boxes, peripheral devices, etc.).

Meanwhile, the peripheral device 200 according to an embodiment of the disclosure may include various electronic devices connected to the home network.

Although FIG. 1 illustrates that the peripheral device 200a, 200b, and 200c includes a notebook computer 200a, a mobile phone 200b, and an air conditioner 200c, but peripheral device 200a, 200b, and 200c is not limited thereto. The peripheral device 200a, 200b, and 200c according to an embodiment of the disclosure may be implemented in various forms. For example, the peripheral device 200a, 200b, and 200c may include a smart phone, a tablet PC, an e-book terminal, a digital broadcasting terminal, a PDA, a PMP, and a navigation device. Also, the peripheral device 200a, 200b, and 200c may include a refrigerator, a speaker, an air cleaner, and a washing machine but the peripheral device 200a, 200b, and 200c is not limited thereto.

Figure 2:
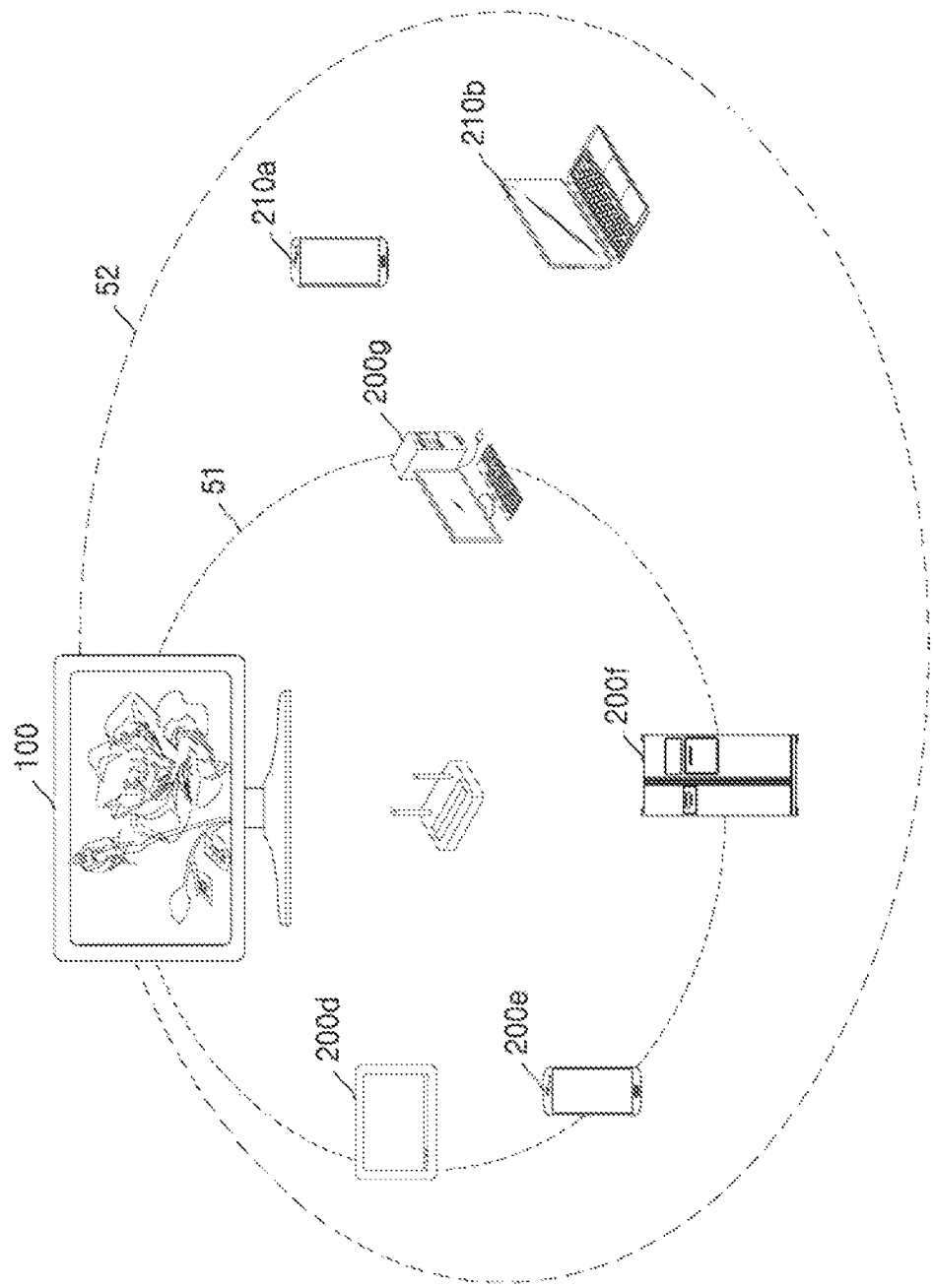
FIG. 2 is a diagram describing a communication range of a device according to an embodiment of the disclosure.

FIG. 2 is a diagram describing a communication range of a device according to an embodiment of the disclosure.

According to an embodiment of the disclosure, the host device 100 and peripheral devices 200d, 200e, 200f, and 200g connected to the same home network according to a WiFi radius 51 may be discovered by using the SSDP protocol for discovering devices on the same network. However, for example, among the peripheral devices 200d, 200e, 200f, and 200g, there may be a device for which the UPnP function is not activated or which does not use an Ethernet or WiFi router. Therefore, such a device may not be discovered.

Meanwhile, a BLE communication radius 52 according to an embodiment of the disclosure may mean a distance (e.g., about 50 m to about 100 m) in which a terminal may receive data (e.g., advertising packets) broadcast from a BLE device. The communication radius according to an embodiment of the disclosure may vary according to the communication situations thereof.

Referring to FIG. 2, the host device 100 may discover devices 200d, 200e, 200f, 200g, 210a, and 210b within the BLE communication radius 52 by using BLE communication. However, the devices within the BLE communication radius 52 may even include, for example, neighborhood devices 210a and 210b connected to another nearby network, which are not devices connected to the same network.

According to an embodiment of the disclosure, additional devices among the devices discovered by BLE communication may be filtered by using the UPnP discovery result, and devices not included in the UPnP discovery result but connected to the same home network may be classified as home network devices by using the BLE communication discovery result.

According to an embodiment of the disclosure, by combining the SSDP protocol and the BLE protocol, the discovery result including the devices connected to the same home network may be more accurately provided to the user.

Figure 3:
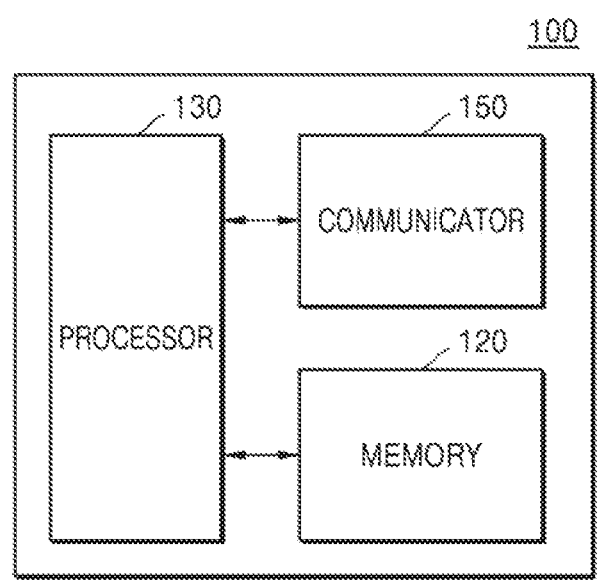
FIG. 3 is a block diagram of an electronic apparatus according to an embodiment of the disclosure.

FIG. 3 is a block diagram of an electronic apparatus according to an embodiment of the disclosure.

FIG. 4 is a block diagram of an electronic apparatus according to an embodiment of the disclosure.

According to an embodiment of the disclosure, an electronic apparatus 100 may operate as the host device 100 of FIGS. 1 and 2. Also, according to an embodiment of the disclosure, the electronic apparatus 100 may operate as at least one of the peripheral devices 200a-g of FIGS. 1 and 2.

As illustrated in FIG. 3, the electronic apparatus 100 according to an embodiment of the disclosure may include a memory 120, a processor 130, and a communicator 150.

For example, as illustrated in FIG. 4, an electronic apparatus 100a according to an embodiment of the disclosure may further include a display 110, a tuner 140, a detector 160, various inputs and outputs (I/O) 170, a video processor 180, an audio processor 115, an audio output 126, a power supply 190, and a sensing unit 191, in addition to the memory 120, the processor 130, and the communicator 150.

The electronic apparatus 100a of FIG. 4 may be an example of the electronic apparatus 100 of FIGS. 1 to 3.

The processor 130 may control an overall operation of the electronic apparatus 100 and a signal flow between the internal components of the electronic apparatus 100 and perform data processing functions. When there is a user's input or a preset stored condition is satisfied, the processor 130 may execute various applications and an operating system (OS) 121 stored in the memory 120.

The processor 130 may be a microprocessor and may include a processor, a read-only memory (ROM) that stores a control program for controlling the electronic apparatus 100, and a random-access memory (RAM) that stores a signal or data input from outside the electronic apparatus 100a or is used as a storage region corresponding to various operations performed by the electronic apparatus 100.

The processor 130 may include a graphic processor (GPU) for graphic processing corresponding to video. The processor 130 may be implemented as a System on Chip (SoC) including a combination of a GPU and a core. The processor 130 may include a single core, a dual core, a triple core, a quad core, or any multiple core thereof.

Also, the processor 130 may include a plurality of processors. For example, the processor 130 may be implemented as a main processor and a sub processor operating in a sleep mode.

According to an embodiment of the disclosure, by executing one or more instructions stored in the memory 120, the processor 130 may control the electronic apparatus 100a to discover the peripheral device 200 through the communicator 150 by using the BLE communication protocol and the SSDP discovery protocol.

Also, according to an embodiment of the disclosure, by executing one or more instructions stored in the memory 120, the processor 130 may control the electronic apparatus 100a to collect peripheral device information based on a message received from the peripheral device 200.

Also, according to an embodiment of the disclosure, by executing one or more instructions stored in the memory 120, the processor 130 may transmit the peripheral device information to the server 300 through the communicator 150.

Also, according to an embodiment of the disclosure, by executing one or more instructions stored in the memory 120, the processor 130 may transmit, to the server 300 through the communicator 150, gateway information of the home network to which the electronic apparatus 100 is connected.

Also, according to an embodiment of the disclosure, the processor 130 may receive a home network device list of the electronic apparatus 100 from the server 300 through the communicator 150.

According to an embodiment of the disclosure, the home network device list may be generated by the server 300 to include a peripheral device having the same gateway information as the gateway information of the electronic apparatus 100, based on the comparison of the gateway information of the electronic apparatus 100 and the gateway information of each peripheral device 200 included in the peripheral device list.

Also, according to an embodiment of the disclosure, by executing one or more instructions stored in the memory 120, the processor 130 may update the peripheral device information and transmit the updated peripheral device information to the server 300 through the communicator 150 based on a preset period.

Also, according to an embodiment of the disclosure, by executing one or more instructions stored in the memory 120, the processor 130 may control the display 110 to display the received home network device list.

The memory 120 may store various data, programs, or applications for operating and controlling the electronic apparatus 100 under the control of the processor 130. The memory 120 may store the input/output signals or data corresponding to the operations of the video processor 180, the display 110, the audio processor 115, the audio output 126, the power supply 190, the tuner 140, the communicator 150, the detector 160, and the input/output 170.

The memory 120 may store an operating system 121 for controlling the electronic apparatus 100a and the processor 130; various applications 122 provided initially by the manufacturer or downloaded from outside, and other data for providing a graphical user interface (GUI) related to an application, objects (e.g., image texts, icons, or buttons) for providing a GUI, user information, documents, databases, or related data.

Also, the memory 120 may include: a TV viewer module 123 including one or more instructions for receiving an input signal from a remote control device and accordingly performing channel control corresponding to the input signal or entering a channel scroll user interface mode when the input signal corresponds to a pre-designated input; a character recognition module 124 including one or more instructions for recognizing information from the content received from an external device; and a Multi Brand Remote Control (MBR) module 125 including one or more instructions for channel control from an external device.

The memory 120 may include a ROM, a RAM, or a memory card (e.g., micro SD card or USB memory) installed in the electronic apparatus 100a. Also, the memory 120 may include a nonvolatile memory, a volatile memory, a hard disk drive (HDD), or a solid state drive (SSD).

According to an embodiment of the disclosure, the memory 120 may include at least one type of storage medium from among flash memory type, hard disk type, multimedia card micro type, card type memory (e.g., SD or XD memory), random-access memory (RAM), static random-access memory (SRAM), read-only memory (ROM), electrically erasable programmable read-only memory (EEPROM), programmable read-only memory (PROM), magnetic memory, magnetic disk, and optical disk.

The display 110 may display the video included in the broadcast signal received through the tuner 140 under the control of the processor 130. Also, the display 110 may display the contents (e.g., moving images) input through the input/output 170 or the communicator 150. The display 110 may output the image stored in the memory 120 under the control of the processor 130.

The display 110 may generate a driving signal by converting an image signal, a data signal, an on-screen display (OSD) signal, or a control signal processed by the processor 130. The display 110 may be implemented as a plasma display panel (PDP), a liquid crystal display (LCD), an organic light emitting diode (OLED) display, or a flexible display and may also be implemented as a three-dimensional (3D) display. Also, the display 110 may be configured as a touch screen to be used as an input device in addition to an output device.

According to an embodiment of the disclosure, the display 110 of the electronic apparatus 100 may be implemented as a plasma display panel (PDP), a liquid crystal display (LCD), an organic light emitting diode (OLED) display, a cathode ray tube (CRT), or the like.

According to an embodiment of the disclosure, the display 110 may display a user interface for discovering a home network device of the electronic apparatus 100a.

Also, according to an embodiment of the disclosure, the display 110 may display a home network device list of the electronic apparatus 100a. According to an embodiment of the disclosure, the display 110 may display a user interface for connecting with a home network device of the electronic apparatus 100a.

The tuner 140 may process a broadcast signal, which is received by wire or wirelessly, through amplification, mixing, and/or resonance, and may tune and select only the frequency of a channel, which is to be received by the electronic apparatus 100, among a plurality of wave components. The broadcast signal may include audio, video, and additional information (e.g., electronic program guide (EPG)).

The tuner 140 may receive a broadcast signal in a frequency band corresponding to a channel number according to a user input (e.g., control signals received from a remote control device, such as a channel number input, a channel up-down input, and a channel input on an EPG screen).

The tuner 140 may receive broadcast signals from various sources such as terrestrial broadcasting, cable broadcasting, satellite broadcasting, and Internet broadcasting. The tuner 140 may receive a broadcast signal from a source such as an analog broadcasting source or a digital broadcasting source.

The broadcast signal received through the tuner 140 may be divided into audio, video, and/or additional information by multiplexing and decoding (e.g., audio decoding, video decoding, or additional information decoding). The audio, video, and/or additional information may be stored in the memory 120 under the control of the processor 130.

The tuner 140 of the electronic apparatus 100 may be singular or plural. The tuner 140 may be implemented as an all-in-one type with respect to the electronic apparatus 100a, or may be implemented by a tuner connected to the input/output 170 or a separate device (e.g., a set-top box) having a tuner connected electrically with the electronic apparatus 100a.

The communicator 150 may connect the electronic apparatus 100 with an external device (e.g., an audio device) under the control of the processor 130. The processor 130 may transmit contents to and receive contents from an external device connected through the communicator 150, download an application from an external device, or perform web browsing. The communicator 150 may include any one of wireless Local Area Network (LAN) 151, Bluetooth 152, and wired Ethernet 153 corresponding to the structure and performance of the electronic apparatus 100. Also, the communicator 150 may include any combination of the wireless LAN 151, the Bluetooth 152, and the wired Ethernet 153.

Also, the communicator 150 may receive a control signal of a remote control device under the control of the processor 130. The control signal may be implemented as a Bluetooth type, a Radio Frequency (RF) signal type, or a WiFi type.

The communicator 150 may further include other short-range communications (e.g., Near Field Communication (NFC) and BLE) in addition to Bluetooth.

According to an embodiment of the disclosure, the communicator 150 may discover a peripheral device within a BLE communication radius by using BLE.

The detector 160 may detect the user's voice, the user's image, or the user's interaction and may include a microphone 161, a camera 162, and a light receiver 163.

The microphone 161 may receive a voice of the user. The microphone 161 may convert the received voice into electrical signals and output the electrical signals to the processor 130. The user's voice may include, for example, a voice corresponding to the function or menu of the electronic apparatus 100.

The camera 162 may obtain image frames such as still images or moving images. The image captured through an image sensor may be processed by the processor 130 or a separate image processor.

The image frame processed by the camera 162 may be stored in the memory 120 or may be transmitted to an external device through the communicator 150. Two or more cameras 162 may be provided according to the configurations of the electronic apparatus 100.

The light receiver 163 may receive an optical signal (including a control signal) received from an external remote control device. The light receiver 163 may receive an optical signal corresponding to a user input (e.g., touch, press, touch gesture, voice, or motion) from a remote control device. The control signal may be extracted from the received optical signal under the control of the processor 130. For example, the light receiver 163 may receive a control signal corresponding to a channel up/down button for channel switching from a remote control device.

The input/output 170 may receive, for example, a video (e.g., moving image), an audio (e.g., voice and music), and additional information (e.g., EPG) from an external source external to the electronic apparatus 100 under the control of the processor 130. The input/output 170 may include at least one of a High-Definition Multimedia Interface (HDMI) port 171, a component jack 172, a PC port 173, and a Universal Serial Bus (USB) port 174. The input/output 170 may include any combination of the HDMI port 171, the component jack 172, the PC port 173, and the USB port 174. An external image providing device may be connected through the HDMI port 171.

The video processor 180 may perform processing on video data received by the electronic apparatus 100. The video processor 180 may perform various image processing on the video data, such as decoding, scaling, noise filtering, frame rate conversion, and resolution conversion.

A graphic processor 181 may generate a screen including various objects such as icons, images, and texts by using an operator and a renderer. The operator may calculate an attribute value such as a coordinate value, a shape, a size, and a color to be displayed for each of the objects according to the layout of the screen by using the user input detected through the detector 160. The renderer may generate a screen of various layouts including objects based on the attribute value calculated by the operator. The screen generated by the renderer may be displayed in a display region of the display 110.

The audio processor 115 may perform processing on audio data. The audio processor 115 may perform various processing such as decoding, amplification, and noise filtering on the audio data. Meanwhile, the audio processor 115 may include a plurality of audio processing modules for processing the audio corresponding to a plurality of contents.

The audio output 126 may output the audio included in the broadcast signal received through the tuner 140 under the control of the processor 130. The audio output 126 may output the audio (e.g., voice and sound) input through the input/output 170 or the communicator 150. Also, the audio output 126 may output the audio stored in the memory 120 under the control of the processor 130. The audio output 126 may include at least one of a speaker 127, a headphone output terminal 128, or a Sony/Philips Digital Interface (S/PDIF) output terminal 129. The audio output 126 may include any combination of the speaker 127, the headphone output terminal 128, and the S/PDIF output terminal 129.

The power supply 190 may supply power, which is input from an external power source, to the components of the electronic apparatus 100a under the control of the processor 130. Also, the power supply 190 may supply power, which is output from one or more batteries located in the electronic apparatus 100, to the components under the control of the processor 130.

The sensing unit 191 may sense the state of the electronic apparatus 100a or the peripheral state of the electronic apparatus 100a and transmit the sensed information to the processor 130.

The sensing unit 191 may include, but is not limited to, at least one of a magnetic sensor 192, an acceleration sensor 193, a temperature/humidity sensor 194, an infrared sensor 195, a gyroscope sensor 196, a position sensor (e.g., Global Positioning System (GPS)) 197, a pressure sensor 198, a proximity sensor 199, and an RGB sensor (illuminance sensor) 211. Because those of ordinary skill in the art may intuitively infer the respective functions of the sensors from the respective names thereof, detailed descriptions thereof will be omitted for conciseness.

Also, the electronic apparatus 100 including the display 110 may be electrically connected to a separate external device (e.g., a set-top box) including the tuner 140.

The electronic apparatus 100a may include, but is not limited to, an analog TV, a digital TV, a 3D TV, a smart TV, an LED TV, an OLED TV, a plasma TV, or a monitor.

Meanwhile, the illustrated block diagrams of the electronic apparatuses 100 and 100a are block diagrams for an embodiment of the disclosure. Each component of the block diagram may be integrated, added, or omitted according to the specifications of the electronic apparatus 100 and 100a that are actually implemented. That is, when necessary, two or more components may be combined into one component, or one component may be divided into two or more components. Also, a function performed in each block is to describe embodiments of the disclosure, and a particular operation or device thereof is not intended to limit the scope of the disclosure.

Figure 5:
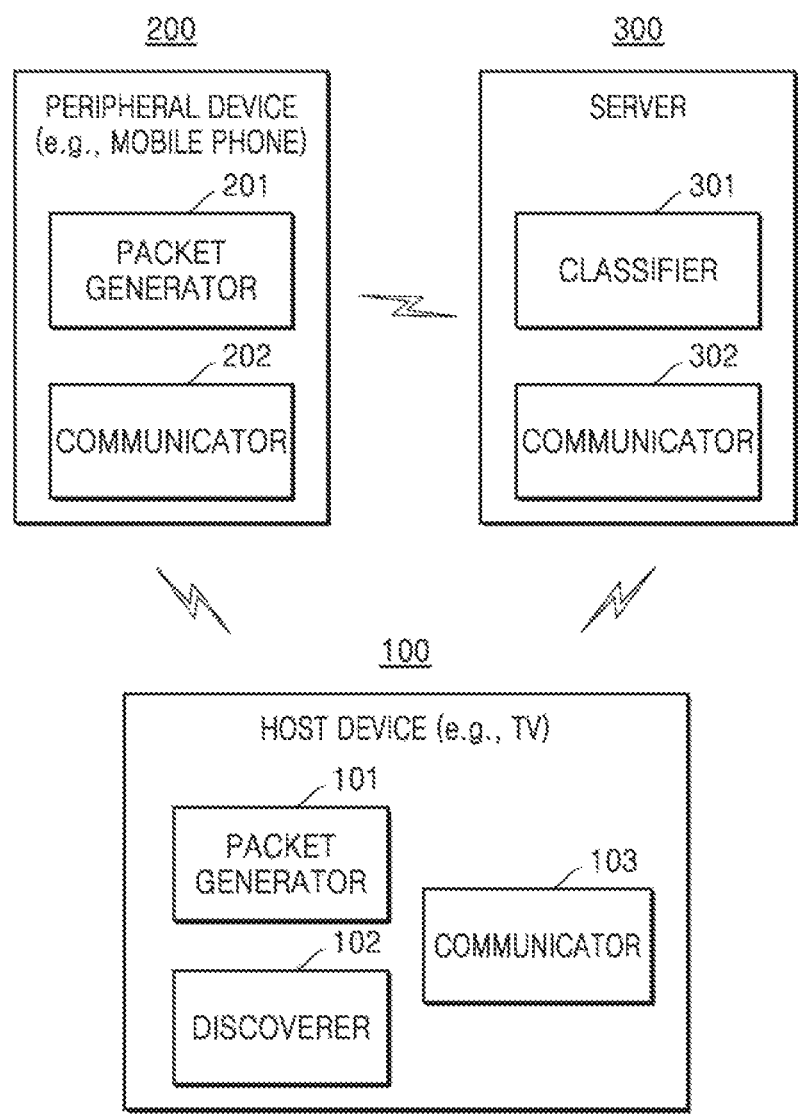
FIG. 5 is a detailed block diagram of a system according to an embodiment of the disclosure.

FIG. 5 is a detailed block diagram of a system according to an embodiment of the disclosure.

FIG. 5 illustrates a host device 100, a peripheral device 200, and a server 300 constituting a system according to an embodiment of the disclosure.

The host device 100 (e.g., a TV) may perform a function of discovering a peripheral device. The host device 100 may include a packet generator 101, a discoverer 102, and a communicator 103.

The peripheral device 200 (e.g., a smart phone) may be a device that may be discovered by the host device 100 by various communication methods. The peripheral device 200 may include a packet generator 201 and a communicator 202.

The server 300 may classify the devices connected to the home network of the host device 100, by using the peripheral device information of the peripheral device 200 acquired from the host device 100. The server 300 may include a classifier 301 and a communicator 302.

The communicators 202, 302, and 103 according to an embodiment of the disclosure may include a BLE communicator.

The packet generators 101 and 201 according to an embodiment of the disclosure may additionally insert the network connection information of a device into a BLE advertising message.

A device having received the BLE advertising message from a peripheral device may identify home network devices based on the network connection information included in the BLE advertising message.

According to an embodiment of the disclosure, the network connection information inserted into the BLE advertising message may include a Medium Access Control (MAC) address of each device and gateway (Ethernet or WiFi router) information of a network currently connected to the device and may be inserted into a manufacturer specific field in an advertising packet of the BLE standard.

Figure 6:
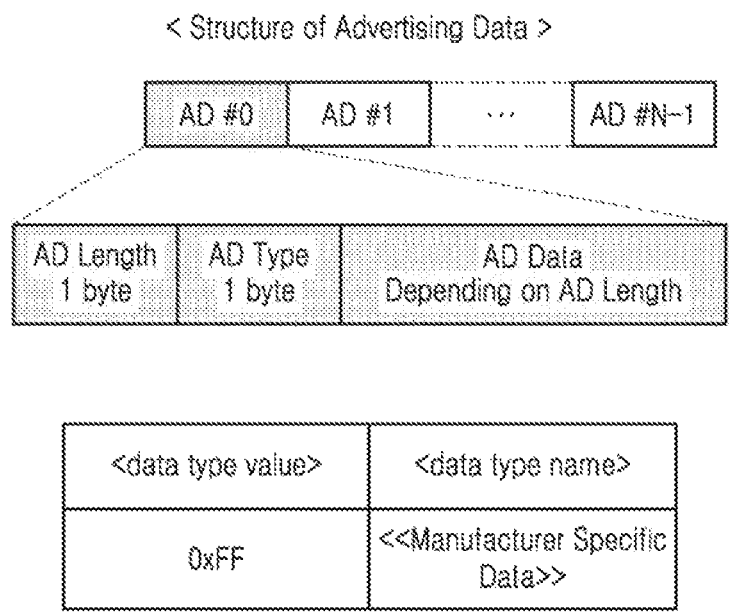
FIG. 6 is a diagram describing a message structure according to the Bluetooth Low Energy (BLE) protocol, according to an embodiment of the disclosure.

FIG. 6 is a diagram for describing a message structure according to the BLE protocol according to an embodiment of the disclosure. Referring to FIG. 6, when 0xFF is input into the AD Type field, Manufacturer Specific Data may be inserted into the AD Data field subsequent thereto, and the MAC address and the device information such as the gateway of a connected network may be input thereto.

According to an embodiment of the disclosure, the discoverer 102 of the host device 100 may collect information of a peripheral device by using the BLE advertising and the SSDP protocol.

The host device 100 (e.g., a TV) including the discoverer 102 may transmit gateway information of a network to which the host device 100 is connected, to the server 300 through the communicator 103.

Because the device connected to the network may be discovered based on the host device 100 including the discoverer 102, the gateway to which the host device 100 is connected may be the gateway used by peripheral devices to be discovered.

The peripheral device 200 using BLE communication may broadcast a BLE advertising message generated through the packet generator 201, to all peripheral devices without specifying a particular device.

The discoverer 102 may receive a BLE advertising message by periodically scanning a channel used by BLE and collect peripheral device information based on the BLE advertising message received from the peripheral device 200.

Also, the devices with UPnP activated may identify the devices connected to the same network, based on the SSDP protocol for discovering UPnP devices on the same network.

According to an embodiment of the disclosure, the discoverer 102 of the host device 100 may discover devices in the same network by using the SSDP discovery protocol.

Figure 7:
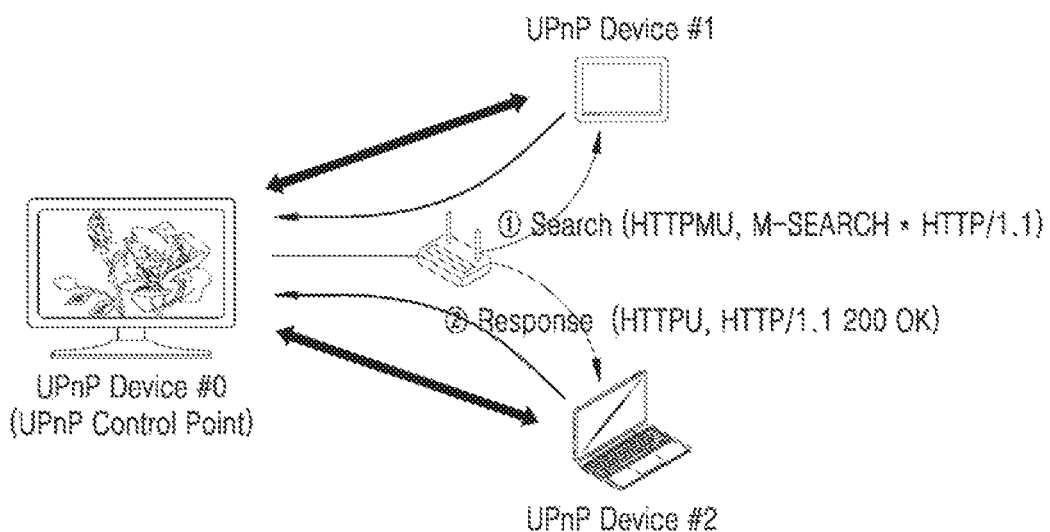
FIG. 7 is a diagram describing a message structure according to the Simple Service Discovery Protocol (SSDP) protocol, according to an embodiment of the disclosure.

FIG. 7 is a diagram for describing a message structure according to the SSDP protocol according to an embodiment of the disclosure. Referring to FIG. 7, a UPnP device (UPnP Device #0) operating as a UPnP control point may transmit a "M-SEARCH*HTTP/1.1" discovery message to discover a UPnP device on the same network (User Datagram Protocol (UDP) multicast). UPnP devices (UPnP Devices #1, #2) having received the discovery message transmit a "HTTP1/1 200 OK" response message to the UPnP control point (UPnP Device #0) (UDP unicast). The LOCATION URL included in the response message according to the SSDP protocol may include detailed information (e.g., manufacturer, model name, model number, model description, etc.) of the device in an extensible markup language (XML) format.

According to an embodiment of the disclosure, in the case of a device with both BLE and UPnP activated, the device may be discovered by both discovery methods, and the discoverer 102 may generate peripheral device information including all of the devices discovered by BLE and UPnP, without performing classification.

According to an embodiment of the disclosure, the host device 100 may upload the generated peripheral device list to the server 300 of the home network account through the communicator 103.

According to an embodiment of the disclosure, after the host device 100 is initially authenticated to the home account, the host device 100 may automatically log in to the home account and periodically upload the peripheral device information discovered through the discoverer 102, to the server 300.

According to an embodiment of the disclosure, the classifier 301 of the server 300 may classify the devices in the home network based on the peripheral device information uploaded to the server 300 and identify the network connection state of the devices.

According to an embodiment of the disclosure, based on the gateway information of the home network received from the host device 100, the classifier 301 may determine whether the peripheral devices discovered by BLE and UPnP included in the peripheral device information are the same home network devices.

According to an embodiment of the disclosure, based on the gateway information of the peripheral device included in the peripheral device information, the classifier 301 may determine whether the corresponding device is connected to the home network. For example, when a device A and a device B are discovered by UPnP, it may be determined that the device A and the device B are connected to the home network because the discovery is made by UPnP.

Also, for example, when a device C is not discovered by UPnP but is discovered by BLE, it may be determined whether the device C is connected to the home network because UPnP is not activated but gateway information is received through BLE.

According to an embodiment of the disclosure, the classifier 301 may classify the same home network devices and store a home network device list. The home network device list may include information about the connection state of the device.

According to an embodiment of the disclosure, the classifier 301 may update the home network device list based on a preset period.

Meanwhile, according to an embodiment of the disclosure, the devices (the host device 100 and the peripheral device 200) connected to the home network may connect to the server 300 of the home network account to download a list of other devices on the home network.

When the host device 100 of FIG. 5 is implemented as the electronic apparatus 100 illustrated in FIGS. 3 and 4, the functions performed by the packet generator 101 and the discoverer 102 may be performed under the control of the processor 130 illustrated in FIGS. 3 and 4. Also, when the peripheral device 200 of FIG. 5 is implemented as the electronic apparatus 100 illustrated in FIGS. 3 and 4, the function performed by the packet generator 201 may be performed under the control of the processor 130 illustrated in FIGS. 3 and 4. Also, the server 300 of FIG. 5 may be implemented in the electronic apparatus 100 illustrated in FIGS. 3 and 4, and thus the function performed by the classifier 301 may be performed under the control of the processor 130 illustrated in FIGS. 3 and 4.

The block diagram illustrated in FIG. 5 is a block diagram for an embodiment of the disclosure. Each component of the block diagram may be integrated, added, or omitted according to the specifications of each device 100, 200, or 300 that are actually implemented. That is, when necessary, two or more components may be combined into one component, or one component may be divided into two or more components. Also, each device 100, 200, or 300 may include more or less components than the illustrated components. Also, a function performed in each block is to describe embodiments of the disclosure, and a particular operation or device thereof is not intended to limit the scope of the disclosure.

Figure 8:
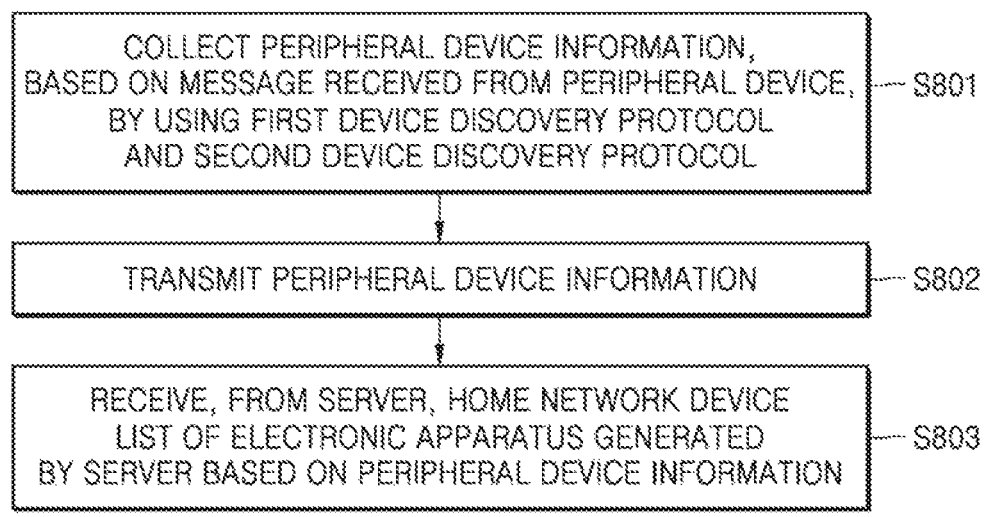
FIG. 8 is a flowchart of a method of operating an electronic apparatus, according to an embodiment of the disclosure.

FIG. 8 is a flowchart of a method of operating an electronic apparatus, according to an embodiment of the disclosure.

FIG. 8 is a flowchart for describing an example in which the electronic apparatus 100 operating as a host device acquires a home network device list, according to an embodiment of the disclosure.

According to an embodiment of the disclosure, the electronic apparatus 100 may be a device operating as a host device (hereinafter referred to as the electronic apparatus 100 or the host device 100).

In operation S801, the electronic apparatus 100 may collect peripheral device information based on a message received from a peripheral device, by using a first device discovery protocol and a second device discovery protocol.

According to an embodiment of the disclosure, to discover devices connected to the home network of the electronic apparatus 100, the electronic apparatus 100 may discover a peripheral device by using the first device discovery protocol (e.g., the BLE communication protocol) and the second device discovery protocol (e.g., the SSDP discovery protocol). According to an embodiment of the disclosure, the electronic apparatus 100 may collect peripheral device information based on a message received from a peripheral device broadcasting a BLE advertising message.

Also, according to an embodiment of the disclosure, the electronic apparatus 100 may transmit an SSDP discovery message for discovering a peripheral device, based on a preset period. The electronic apparatus 100 may collect peripheral device information based on an SSDP response message received from a peripheral device. According to an embodiment of the disclosure, the peripheral device information may include at least one of identification information (e.g., manufacturer name, model name, product unique number, etc.) of the peripheral device, a MAC address of the peripheral device, or gateway information of the network to which the peripheral device is connected.

According to an embodiment of the disclosure, the electronic apparatus 100 may update the peripheral device information based on a preset period. The electronic apparatus 100 may update the peripheral device information based on a newly received response message.

In operation S802, the electronic apparatus 100 may transmit the peripheral device information to the server 300.

According to an embodiment of the disclosure, the electronic apparatus 100 may transmit the updated peripheral device information to the server 300 through the communicator 103 (see FIG. 5) based on a preset period.

In operation S803, the electronic apparatus 100 may receive, from the server 300, a home network device list of the electronic apparatus 100 generated by the server 300 based on the peripheral device information.

According to an embodiment of the disclosure, the electronic apparatus 100 may transmit, to the server 300, gateway information of the home network to which the electronic apparatus 100 is connected, and the server 300 may store gateway information of the host device 100.

According to an embodiment of the disclosure, the server 300 may compare gateway information of the electronic apparatus 100 and gateway information of each peripheral device 200 included in the peripheral device list. The server 300 may generate a home network device list of the electronic apparatus 100 by classifying peripheral devices having the same gateway information as the gateway information of the electronic apparatus 100. The server 300 may transmit the generated home network device list to the host device 100.

As described above, the server 300 may be implemented within the electronic apparatus. In the configuration in which the server 300 is implemented within the electronic apparatus, the electronic apparatus 100 may determine the home network device list.

FIG. 9 is a flowchart of a method of operating a system, according to an embodiment of the disclosure.

The system according to an embodiment of the disclosure may include a host device 100, a peripheral device 200, and a server 300. According to an embodiment of the disclosure, the host device 100 and the peripheral device 200 may be home network devices.

In operation S901, the host device 100 may discover the peripheral device 200.

According to an embodiment of the disclosure, the host device 100 may discover a peripheral device by using the BLE communication protocol and the SSDP discovery protocol.

Particularly, in operation S902, the host device 100 may receive a BLE advertising message broadcast by the peripheral device 200 through BLE communication.

In operation S903, the host device 100 may transmit an SSDP discovery message by using the SSDP protocol. In operation S904, the peripheral device 200 having received the SSDP discovery message may transmit an SSDP response message. In operation S905, the host device 100 may collect peripheral device information.

According to an embodiment of the disclosure, the host device 100 may collect peripheral device information based on a message received from the peripheral device 200.

According to an embodiment of the disclosure, the peripheral device information may include at least one of identification information (e.g., manufacturer name, model name, product unique number, etc.) of the peripheral device, a MAC address of the peripheral device, or gateway information of the network to which the peripheral device is connected.

In operation S906, the host device 100 may transmit the peripheral device information to the server 300.

In operation S907, the server 300 may generate a home network device list of the host device 100.

According to an embodiment of the disclosure, the server 300 may use the stored gateway information of the host device 100 to generate the home network device list. The server 300 may generate the home network device list including the peripheral device having the same gateway information as the gateway information of the host device 100 by comparing the gateway information of the host device 100 and the gateway information of each peripheral device included in the peripheral device list.

In operation S908, the server 300 may transmit the home network device list to the host device 100.

In operation S909, the server 300 may transmit the home network device list to the peripheral device 200. According to an embodiment of the disclosure, the peripheral device 200 may connect to the server 300 with the home network account and request the server 300 for information about the devices connected to the home network of the peripheral device 200.

FIGS. 10A-C, 11, and 12 are diagrams for describing various examples of discovering a peripheral device, according to an embodiment of the disclosure.

Figure 10A:
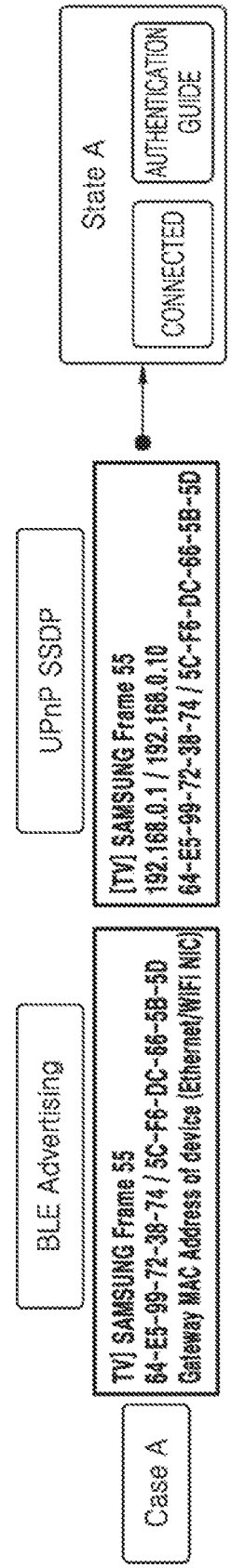
FIG. 10A is a diagram describing an example of discovering a peripheral device, according to an embodiment of the disclosure.

FIG. 10A is a diagram describing an example in which a device A is discovered by both BLE and UPnP.

Because UPnP may discover only devices connected to the same network, the device A discovered by UPnP may be determined as a device connected to the home network.

Also, the device A may be recognized as a device predetermined as a home network device through UPnP based on the MAC address of the device A acquired from BLE discovery, and thus the device A may be identified as a home network device (State A: a device determined as a home network device).

Figure 10B:
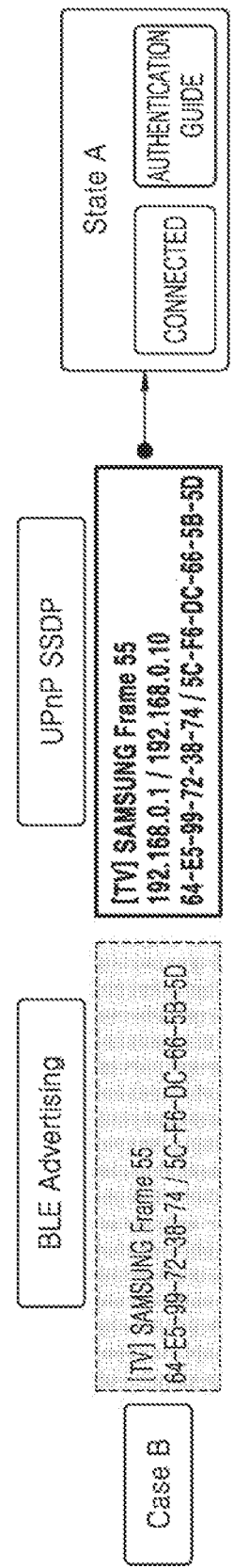
FIG. 10B is a diagram describing an example of discovering a peripheral device, according to an embodiment of the disclosure.

FIG. 10B is a diagram for describing an example in which a device B is discovered by UPnP and is not discovered by BLE.

Because the device B is discovered by UPnP, it may be determined as a home network device (State A: a device determined as a home network device).

Meanwhile, although the device B is determined as a home network device, it may not be discovered by BLE because the host device 100 and the device B are located at a physically long distance beyond the BLE communication radius and it may not be discovered because the BLE of the device B is not activated.

Figure 10C:
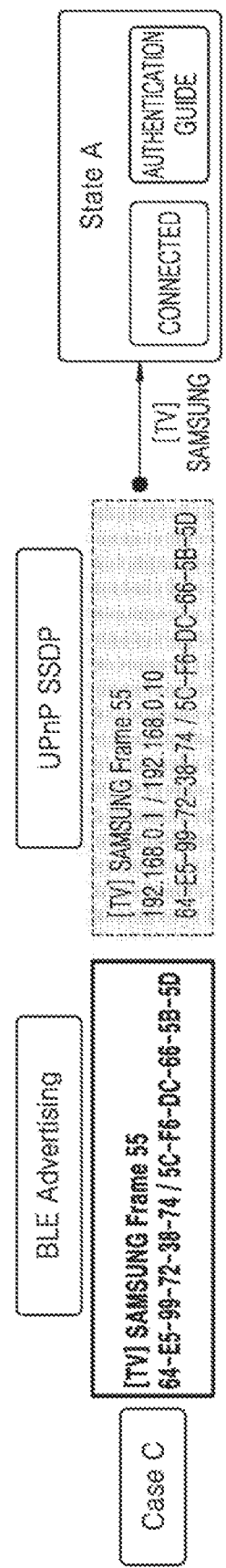
FIG. 10C is a diagram describing an example of discovering a peripheral device, according to an embodiment of the disclosure.

FIG. 10C is a diagram for describing an example in which a device C is discovered by BLE and is not discovered by UPnP.

According to an embodiment of the disclosure, the server 300 may identify the MAC address of the device C and the gateway of the network to which the device C is connected, through the BLE advertising message of the device C. When the network to which the device C is connected is the same as the gateway information of the home network of the host device 100 pre-registered in the server 300, although the UPnP thereof is not activated, the device C may be classified as a device in the home network and the MAC address of the device C may be added to the home network device list (State A: a device determined as a home network device).

Figure 11:
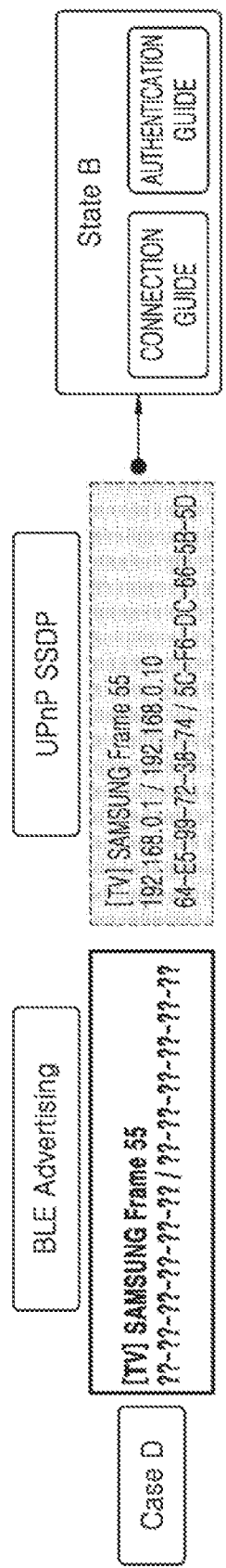
FIG. 11 is a diagram describing an example of discovering a peripheral device, according to an embodiment of the disclosure.

FIG. 11 is a diagram for describing an example in which a device D is not discovered by UPnP and is discovered by BLE but does not include network connection information.

For example, when the device D (e.g., an air conditioner) is not connected to the Internet, it may not be discovered by UPnP and its MAC address and gateway information may not be identified in the BLE discovery result.

According to an embodiment of the disclosure, when the possibility of the device D being a home network device may not be excluded, it may be included in the home network device list (State B: a device that may be a home network device).

Figure 12:
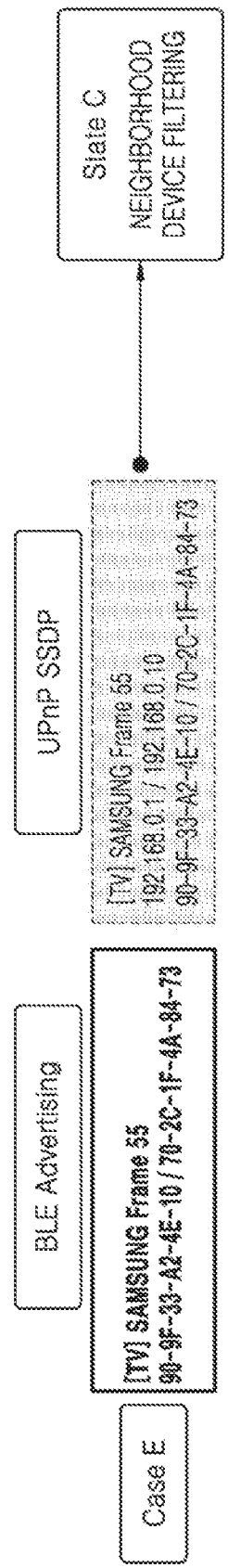
FIG. 12 is a diagram describing an example of discovering a peripheral device, according to an embodiment of the disclosure.

FIG. 12 is a diagram for describing an example in which a device E is discovered by BLE and is not discovered by UPnP.

According to an embodiment of the disclosure, when the server 300 may identify the gateway of the home network to which the device E is connected, through the BLE advertising message of the device E and the gateway of the home network to which the device E is connected is not the same as the pre-registered gateway information of the home network, because the device E is a device of another household outside the home, it may not be added to the home network device list (State C: not a home network device).

Figure 13:
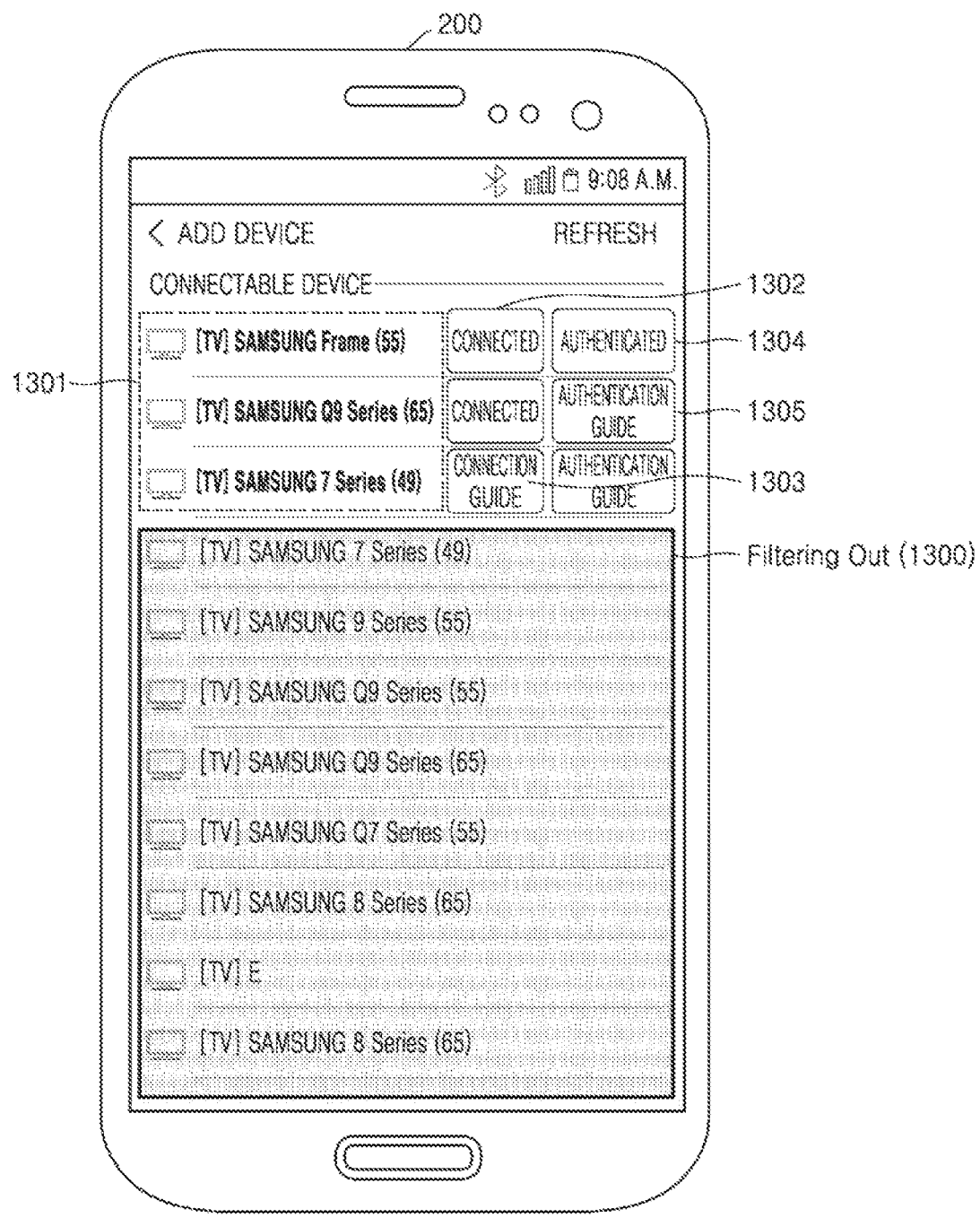
FIG. 13 is a diagram describing an example of displaying a home network device list, according to an embodiment of the disclosure.

FIG. 13 is a diagram describing an example of displaying a home network device list, according to an embodiment of the disclosure.

According to an embodiment of the disclosure, the peripheral device 200 (e.g., a smart phone) may log in to the server 300 with the home network account. The peripheral device 200 (e.g., a smart phone) may connect to the server 300 to request the home network device list. The server 300 may transmit the home network device list to the peripheral device 200.

The home network device list may include the home network device list of the peripheral device 200, which is obtained by filtering a peripheral device list 1300 (e.g., outdoor neighborhood devices) that is discovered through BLE communication but is not connected to the same home network.

According to an embodiment of the disclosure, the peripheral device 200 may provide a user interface for displaying the home network device list.

For example, the peripheral device 200 may display identification information (e.g., device manufacturer, model name, device type, etc.) 1301 of the device included in the home network device list.

Also, for example, the peripheral device 200 may display an icon 1302 indicating that the device included in the home network device list has been connected to the Internet.

For example, an icon 1303 for providing a connection guide may also be displayed for a device that is not connected to the Internet among the devices classified as the home network list.

Meanwhile, the peripheral device 200 may require an authentication procedure at initial connection to attempt to connect with the device included in the home network device list. In this case, an icon 1304 indicating that a device with an authentication record has been authenticated may also be displayed.

Also, for example, an icon 1305 for providing an authentication guide may also be displayed for a device without an authentication record.

According to an embodiment of the disclosure, a user interface for the connection, registration, and authentication procedure between the home network devices may be provided more accurately and conveniently by automatically providing the connection state, connection guide, and authentication guide of the home network devices.

The operations of the above embodiments of the disclosure may be implemented as programs executable by computers and may be provided in general-purpose digital computers that execute the programs read from computer-readable recording mediums. Also, the data structure used in the above embodiments of the disclosure may be written on computer-readable recording mediums through various means. Also, the above embodiments of the disclosure may be implemented in the form of computer-readable recording mediums including instructions executable by computers, such as program modules executed by computers. For example, the methods implemented by software modules or algorithms may be stored on computer-readable recording mediums as computer-readable and computer-executable codes or program commands.

The computer-readable recording mediums may be any available mediums accessible by computers and may include volatile or non-volatile mediums and removable or non-removable mediums. The computer-readable recording mediums may include, but are not limited to, magnetic storage mediums such as ROMs, floppy disks, or hard disks and optical storage mediums such as CD-ROMs or DVDs. Also, the computer-readable recording mediums may include computer storage mediums and communication mediums.

Also, a plurality of computer-readable recording mediums may be distributed in networked computer systems, and data stored in the distributed recording mediums, for example, program instructions and code, may be executed by at least one computer.

Particular implementations described herein are merely embodiments of the disclosure and do not limit the scope of the disclosure in any way. For the sake of conciseness, descriptions of related art electronic configurations, control systems, software, and other functional aspects of the systems may be omitted.

The foregoing is merely for describing the embodiments of the disclosure, and those of ordinary skill in the art will readily understand that various modifications may be made in the embodiments of the disclosure without materially departing from the spirits and features of the disclosure. Therefore, it is to be understood that the embodiments of the disclosure described above should be considered in a descriptive sense only and not for purposes of limitation. For example, elements described as being combined may also be implemented in a distributed manner, and elements described as being distributed may also be implemented in a combined manner.

All examples or example terms (e.g., "such as") provided herein are merely used to describe the disclosure in detail, and the scope of the disclosure is not limited by the examples or example terms unless otherwise claimed.

Also, no element may be essential to the practice of the disclosure unless the element is particularly described as "essential" or "critical".

However, those of ordinary skill in the art will understand that various changes in form and details may be made therein without departing from the spirit and scope of the disclosure as defined by the appended claims.

The disclosure may be variously modified and may have various embodiments, and thus it should be understood that the disclosure is not limited to particular embodiments of the disclosure described herein and all modifications, equivalents, or substitutions included in the spirit and scope of the disclosure are included in the disclosure. Therefore, the described embodiments of the disclosure should be considered in descriptive sense only and not for purposes of limitation.

The scope of the disclosure is defined not by the above detailed description but by the following claims, and all modifications or differences within the scope should be construed as being included in the scope of the disclosure.

As described herein, the terms "units" and "modules" may refer to units that perform at least one function or operation, and the units may be implemented as hardware or software or a combination of hardware and software.

The "unit" or "module" may be implemented by a program that may be stored in an addressable storage medium and may be executed by a processor.

For example, the "unit" or "module" may be implemented by components such as software components, object-oriented software components, class components, and task components, processes, functions, attributes, procedures, subroutines, segments of program code, drivers, firmware, microcode, circuits, data, databases, data structures, tables, arrays, and variables.

What is claimed is:

1. An electronic apparatus comprising:
 a communicator;
 a memory storing one or more instructions; and
 a processor configured to control the electronic apparatus by executing the one or more instructions, wherein the processor executing the one or more instructions is configured to:
  obtain peripheral device information of a peripheral device based on a message including at least one of a first message received from the peripheral device using a first device discovery protocol and a second message received from the peripheral device using a second device discovery protocol;
  transmit second gateway information of the electronic apparatus to a server through the communicator;
  transmit the peripheral device information including first gateway information of a network to which the peripheral device is connected to the server through the communicator; and
  receive, from the server through the communicator, a home network device list of the electronic apparatus indicating whether the peripheral device is connected to a home network to which the electronic apparatus is connected, the home network device list having been generated by the server based on at least one of the second gateway information of the electronic apparatus and the peripheral device information,
 wherein the home network device list of the electronic apparatus indicates that the peripheral device is connected to the home network, in case that (i) the peripheral device information is obtained based on the second message received using the second device discovery protocol, or (ii) the peripheral device information is obtained based on the first message including the first gateway information received using the first device discovery protocol, the first gateway information being the same as the second gateway information of the electronic apparatus.

2. The electronic apparatus of claim 1, wherein the home network device list is generated by the server to include the peripheral device based on the first gateway information of the peripheral device that is the same as the second gateway information of the electronic apparatus, according to a comparison of the second gateway information of the electronic apparatus and the first gateway information of the peripheral device included in the peripheral device information.

3. The electronic apparatus of claim 1, wherein the processor executing the one or more instructions is further configured to transmit the peripheral device information to the server through the communicator based on a preset period.

4. The electronic apparatus of claim 1, wherein the processor executing the one or more instructions is further configured to transmit, to the server through the communicator, gateway information of the home network to which the electronic apparatus is connected.

5. The electronic apparatus of claim 1, wherein the processor executing the one or more instructions is further configured to control a display to display the home network device list.

6. The electronic apparatus of claim 1, wherein the first message received from the peripheral device includes identification information of the peripheral device.

7. The electronic apparatus of claim 1, wherein the first message received from the peripheral device includes first connection information of the peripheral device, and
 wherein the first connection information of the peripheral device includes at least one of Medium Access Control (MAC) address information of the peripheral device and gateway information of the network to which the peripheral device is connected.

8. The electronic apparatus of claim 1, wherein the first device discovery protocol is a Bluetooth Low Energy (BLE) communication protocol, and
 wherein the second device discovery protocol is a Simple Service Discovery Protocol (SSDP) discovery protocol.

9. A method of an electronic apparatus discovering a peripheral device, the method comprising:
 obtaining peripheral device information of the peripheral device based on a message including at least one of a first message received from the peripheral device using a first device discovery protocol and a second message received from the peripheral device using a second device discovery protocol;
 transmitting second gateway information of the electronic apparatus to a server through a communicator;
 transmitting the peripheral device information including first gateway information of a network to which the peripheral device is connected to the server; and receiving, from the server, a home network device list of the electronic apparatus indicating whether the peripheral device is connected to a home network to which the electronic apparatus is connected, the home network device list having been generated by the server based on at least one of the second gateway information of the electronic apparatus and the peripheral device information, wherein the home network device list of the electronic apparatus indicates that the peripheral device is connected to the home network, in case that (i) the peripheral device information is obtained based on the second message received using the second device discovery protocol, or (ii) the peripheral device information is obtained based on the first message including the first gateway information received using the first device discovery protocol, the first gateway information being the same as the second gateway information of the electronic apparatus.

10. The method of claim 9, wherein the home network device list is generated by the server to include the peripheral device based on the first gateway information of the peripheral device that is the same as the second gateway information of the electronic apparatus, according to a comparison of the second gateway information of the electronic apparatus and the first gateway information of the peripheral device included in the peripheral device information.

11. The method of claim 9, wherein the transmitting of the peripheral device information to the server comprises transmitting the peripheral device information to the server based on a preset period.

12. The method of claim 9, further comprising transmitting, to the server, gateway information of the home network to which the electronic apparatus is connected.

13. The method of claim 9, further comprising displaying the home network device list.

14. The method of claim 9, wherein the first message received from the peripheral device includes identification information of the peripheral device.

15. The method of claim 9, wherein the message received from the peripheral device includes first connection information of the peripheral device, and wherein the first connection information of the peripheral device includes at least one of Medium Access Control (MAC) address information of the peripheral device and gateway information of the network to which the peripheral device is connected.

16. A method of discovering a home network device, the method comprising:

receiving, from a host device, first gateway information of a home network to which the host device is connected;

receiving, from the host device, peripheral device information including the first gateway information of the home network device discovered by the host device based on a message including at least one of a first message received from at least one peripheral device using a first device discovery protocol and a second message received from the at least one peripheral device using a second device discovery protocol;

generating a home network device list to include the home network device, based on a comparison of second gateway information of the host device and the first gateway information of the home network device included in the peripheral device information; and transmitting the home network device list to the host device.

17. The method of claim 16, further comprising transmitting, in response to a request signal of the home network device included in the home network device list, the home network device list to the home network device.

18. A non-transitory computer-readable recording medium that stores a program that, when executed by a computer, controls the computer to perform the method of claim 9.

* * * * *